United States Patent [19]

Young et al.

[11] 4,281,271

[45] Jul. 28, 1981

[54] COMPACT FLUORESCENT LAMP HAVING A PARTITIONED ENVELOPE

[75] Inventors: Robert G. Young, Nutley; John F. Gilmore, Verona, both of N.J.

[73] Assignee: Westinghouse Electric Corp., Pittsburgh, Pa.

[21] Appl. No.: 47,834

[22] Filed: Jun. 12, 1979

[51] Int. Cl.³ .................. H01J 61/10; H01J 61/33; H01J 61/42

[52] U.S. Cl. .................................. 313/493; 313/204

[58] Field of Search ............................ 313/493, 204

[56] References Cited

U.S. PATENT DOCUMENTS

| 1,963,962 | 6/1934 | Barclay . | |
|---|---|---|---|
| 2,121,333 | 6/1938 | Barclay . | |
| 2,133,205 | 10/1938 | McCauley . | |
| 3,024,383 | 3/1962 | Doering | 313/204 |
| 3,084,271 | 4/1963 | Swanson | 313/1 |
| 3,521,120 | 7/1970 | Anderson | 313/201 X |
| 3,899,712 | 8/1975 | Witting | 313/493 |
| 3,903,447 | 9/1975 | Young et al. | 313/204 X |
| 3,953,761 | 4/1976 | Logiudice | 315/71 |
| 4,095,135 | 6/1978 | Yamazaki et al. | 313/493 |
| 4,184,101 | 1/1980 | Young | 313/493 X |
| 4,185,221 | 1/1980 | Young | 313/493 X |
| 4,187,446 | 2/1980 | Gross et al. | 313/204 X |
| 4,191,907 | 3/1980 | Rogoff | 313/204 |

FOREIGN PATENT DOCUMENTS 906245 3/1954 Fed. Rep. of Germany ........... 313/493
2723498 12/1978 Fed. Rep. of Germany ........... 313/493

Primary Examiner—Palmer C. Demeo
Attorney, Agent, or Firm—D. S. Buleza

[57] ABSTRACT

The light output of a compact fluorescent lamp is enhanced by providing the envelope with a phosphor-coated partition assembly which has a plurality of panel segments that divide the envelope interior into a series of interconnected sectors and also define a centrally-located core chamber that is closed to the discharge. The size of the core chamber is correlated with the size of the envelope in such a manner that the discharge is displaced from the center of the envelope toward the phosphor-coated walls thereof, thus reducing losses due to the "trapping" of light deep within the envelope interior and concurrently increasing the relative amount of ultraviolet radiation that reaches and excites the phosphor coating on the envelope wall. The efficacy of the partitioned fluorescent lamp is accordingly increased. The size-correlation is rather critical and must be such that the maximum cross-sectional dimension of the core chamber at a given location is from about 25% to about 85% of the maximum cross-sectional dimension of the envelope at the same location and optimum results are obtained when this parameter is around 50%. The improved fluorescent lamp is thus especially adapted for use as a substitute for incandescent lamps in various types of lighting fixtures where space is limited and a light source of high brightness is required.

10 Claims, 17 Drawing Figures

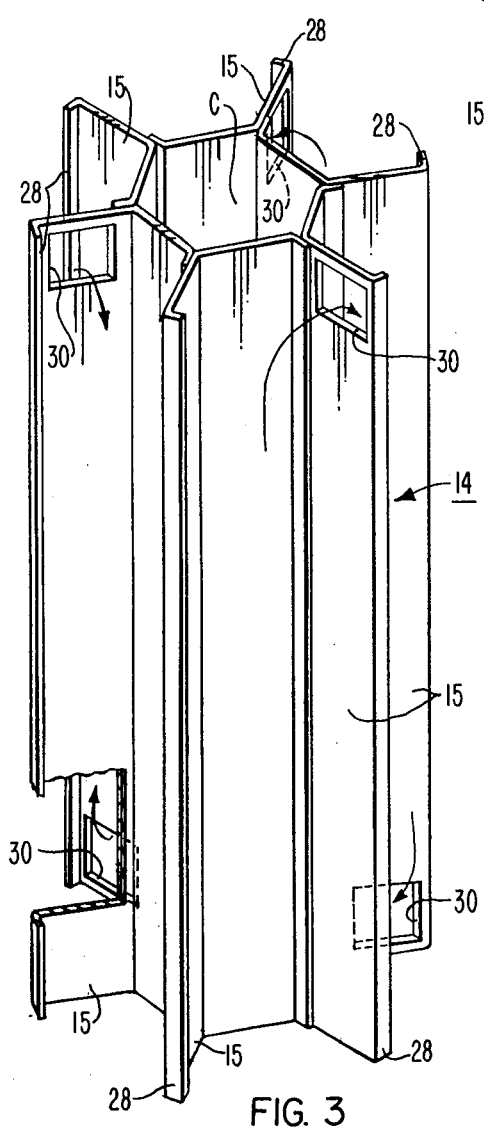
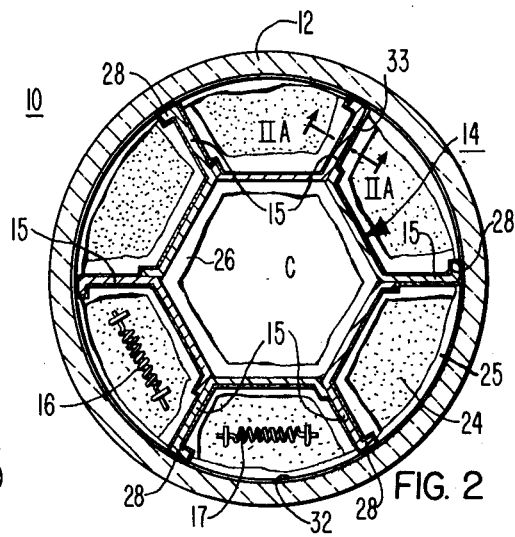
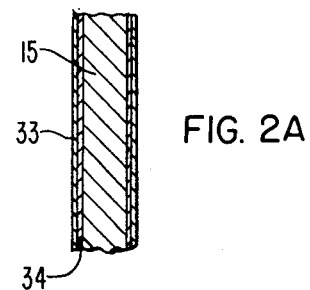
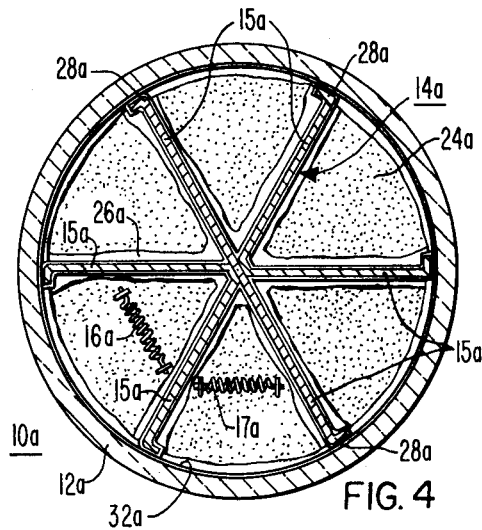

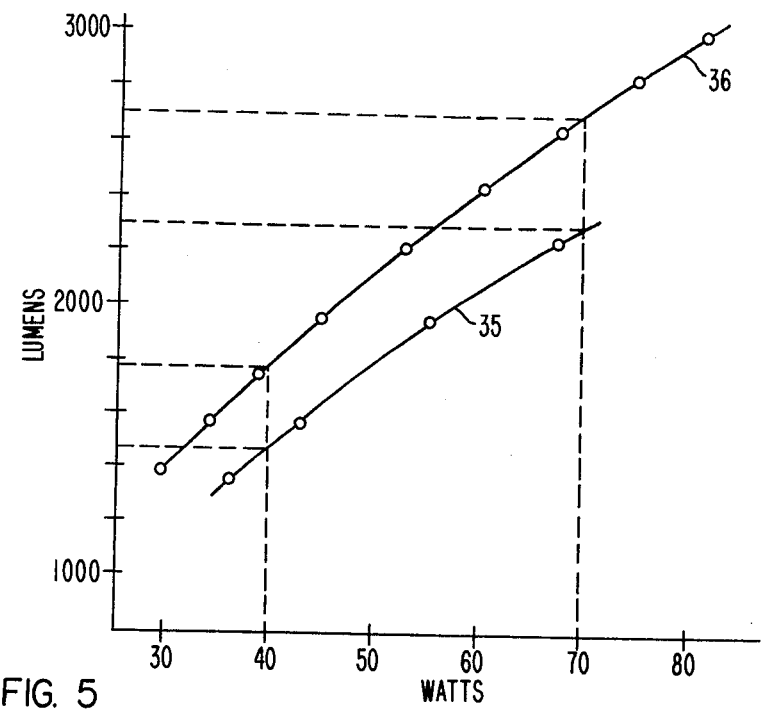
FIG. 5
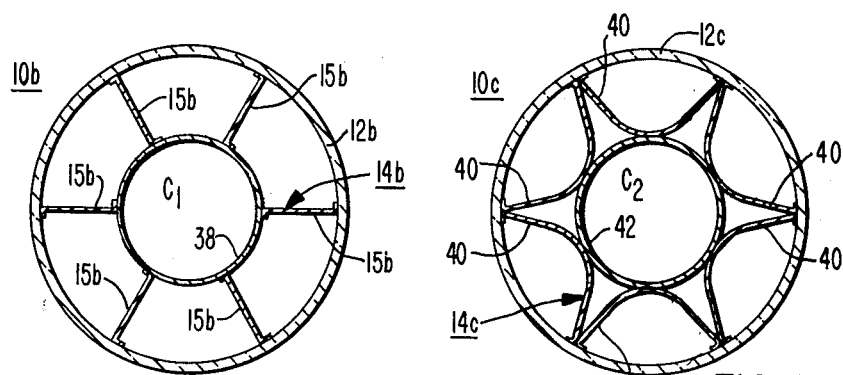
FIG. 6A
FIG. 6B
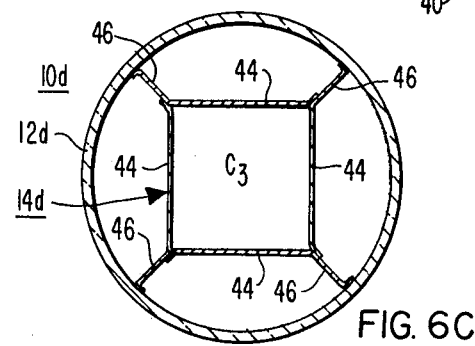
FIG. 6C

COMPACT FLUORESCENT LAMP HAVING A PARTITIONED ENVELOPE

CROSS-REFERENCE TO RELATED APPLICATIONS

The subject matter of this application is an improvement over that disclosed in application Ser. No. 944,495 of G. L. Rogoff, filed Sept. 21, 1978 (now U.S. Pat. No. 4,191,907); and application Ser. No. 923,599 of R. G. Young, filed July 11, 1978 (now U.S. Pat. No. 4,185,221), both of which are assigned to the same assignee as this application.

BACKGROUND OF THE INVENTION

1. Field of the Invention

This invention generally relates to discharge lamps and has particular reference to an improved fluorescent lamp of compact size and high brightness that has a partitioned envelope and is suitable for use in residential and commercial lighting fixtures.

2. Description of the Prior Art

Electric discharge lamps having envelopes which are internally partitioned to provide one or more elongated discharge paths are generally well known in the art. U.S. Pat. No. 2,121,333 to Barclay discloses a single-ended type lamp of such construction wherein glass panels joined to the glass envelope serve as the partition means. Another fluorescent lamp of this general type is disclosed in U.S. Pat. No. 3,024,383 to Doering and employs a thin sheet of glass or suitable ceramic as the partition means which divides the interior of the envelope into either two or four sectors. A double-ended fluorescent lamp having a longitudinal partition that extends along the axis of the envelope between two pairs of oppositely-disposed electrodes to provide a dual-arc device is disclosed in U.S. Pat. No. 3,084,271 to C. E. Swanson.

Discharge lamps having envelopes with partition means or a filler or core member that prevents the arc passing between the electrodes along the axis of the envelope are also generally well known in the art. For example, in U.S. Pat. No. 1,963,962 to Barclay the tubular envelope of a discharge lamp is partitioned in such a manner that a plurality of arc channels disposed around a central bore or channel are provided. U.S. Pat. No. 2,133,205 to McCauley discloses a tubular double-ended discharge lamp that has a channelled core or filler member which forces the arc to follow different paths and produce a changing luminous effect. Various types of fluorescent lamps having envelopes that are so constructed that the discharge is prevented from passing along the center of the envelope (or is made to follow a path around an inner envelope) component are disclosed in U.S. Pat. Nos. 3,521,120 (Anderson); 3,953,761 (LoGiudice, FIGS. 6–8 embodiments); and 4,095,135 (Yamazaki et al). Fluorescent lamps having bulbs which force the arc to follow a helical path around the bulb axis are disclosed in U.S. Pat. Nos. 3,899,712 to Witting and 3,903,447 to Young et al.

SUMMARY OF THE INVENTION

In accordance with the present invention, a compact fluorescent lamp of high brightness and improved efficacy is provided by dividing a tubular envelope into a plurality of interconnected sectors that are disposed around a central core chamber and force the discharge to follow an elongated retroverted path without traversing the core chamber. The size of the core chamber relative to that of the envelope must be maintained within certain limits in order to reduce the "light-trapping" effect along the envelope axis as much as possible without increasing the current density and starting voltage characteristics of the lamp beyond practical limits.

In accordance with the preferred embodiments of the present invention, the tubular envelope of either a single-ended or double-ended fluorescent lamp is provided with a sheet-metal partition that is phosphor coated and inserted into the envelope to provide a predetermined number of interconnected arc chambers and a closed core chamber the maximum cross-sectional dimension whereof is from about 25% to about 85% of the envelope diameter (or maximum cross-sectional dimension of the envelope if it has a non-circular cross-section). A core chamber that is around 50% the size of the envelope is optimum.

BRIEF DESCRIPTION OF THE DRAWINGS

A better understanding of the invention will be obtained from the following exemplary embodiments shown in the accompanying drawings, wherein:

FIG. 2 is an enlarged cross-sectional view of the lamp shown in FIG. 1;

FIG. 2A is an enlarged cross-sectional view through one of the phosphor-coated partition panels, along line IIA—IIA of FIG. 2;

FIG. 3 is a perspective view of the partition assembly employed in the lamp shown in FIGS. 1 and 2, a portion of the partition being removed for illustrative purposes;

FIG. 4 is a cross-sectional view through a single-ended fluorescent lamp of the same type as the lamp of FIGS. 1 and 2 except that it has a partition assembly of conventional construction which divides the envelope into six triangular-shaped sectors;

FIG. 5 is a graph showing the lumen increase derived from a fluorescent lamp employing the improved partition assembly of the present invention;

FIGS. 6A to 6C are cross-sectional views of alternative lamp embodiments having partition assemblies that provide core chambers and arc channels of various shapes and sizes;

DESCRIPTION OF THE PREFERRED EMBODIMENTS

Figure 1:
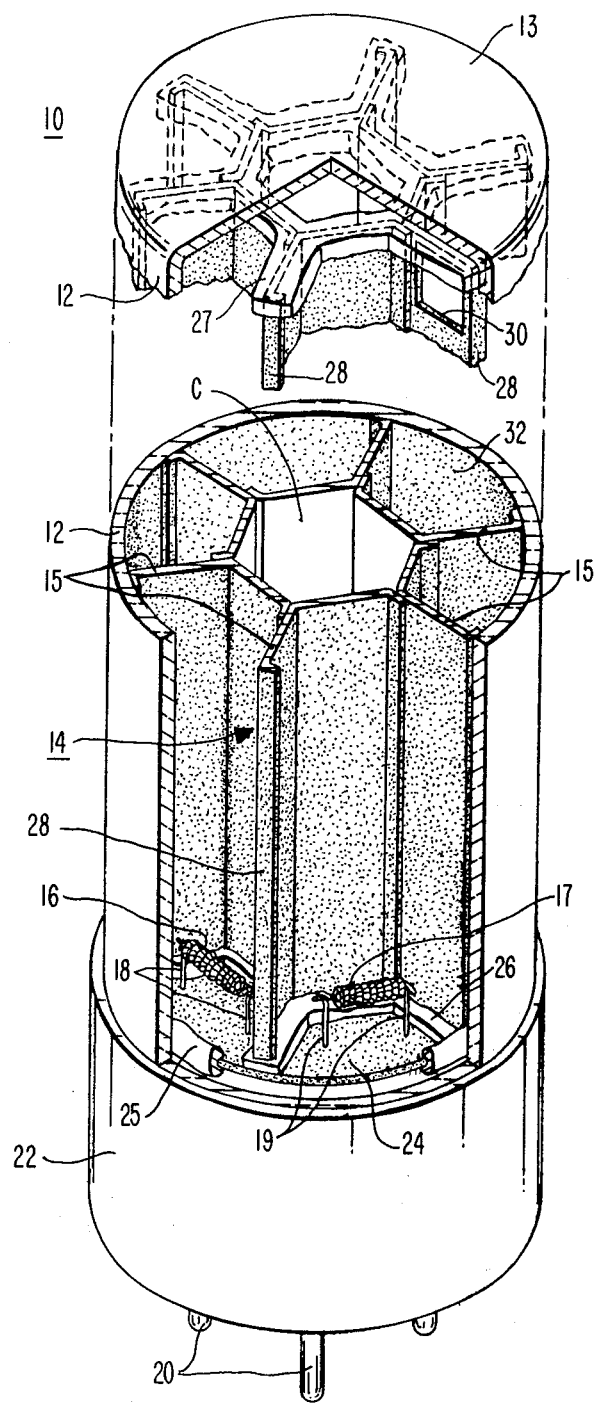
FIG. 1 is a perspective cut-away view of a compact single-ended fluorescent lamp that embodies the invention and has six envelope sectors disposed around a core chamber.

A compact fluorescent lamp 10 of single-ended construction that embodies the present invention is shown in FIGS. 1 and 2. As will be noted, the lamp comprises a vitreous envelope 12 of cylindrical configuration that is terminated at one end by a flat end wall 13 and contains a partition assembly 14 which is inserted into the envelope and has a plurality of panel segments 15 that extend longitudinally along and inwardly from the envelope walls. The panel segments 15 are so shaped and arranged that they divide the interior of the envelope 12 into a plurality of interconnected sectors and a central chamber C that constitutes the core of the partition assembly 14 and extends along the envelope axis. A pair of thermionic electrodes 16 and 17 are located at the sealed end of the envelope 12 on opposite sides of one of the planar segments 15 that extends between and physically isolates the electrodes from one another. The electrodes are held in such position by suitable lead-in conductor means such as lead wires 18 and 19 that extend through the sealed end of the envelope 12 and are connected to suitable terminals, such as metal pins 20, that are secured to and extend from a suitable base member 22 that is fastened to the envelope.

The partition assembly 14 is preferably fabricated from six identically shaped pieces of sheet metal that are spot welded along overlapped joints, as illustrated in FIGS. 1-3. The resulting integral assembly is supported in upstanding position within the envelope 12 by a disc 24 of suitable insulating material that is anchored to the lead-in wires 18 and 19. The periphery of the support disc 24 is fitted with a gasket 25 of inert pliant material which makes a snug fit with the envelope 12. This prevents the arc from bypassing the partition assembly 14 and following a more direct path to the exposed portions of the lead wires located beneath the support disc 24. For the same reason, the ends of the panel segments 15 are seated against suitably shaped pads 26 and 27 that are fabricated from the same or similar inert compliant material and are cut to overlap and be sandwiched between the associated ends of the partition assembly 14 and the support disc 24 and end wall 13 of the envelope, respectively. Short circuiting of the arc along the longitudinal edges of the panel segments 15 is avoided by forming such edges into laterally extending tabs 28 that are seated against the envelope walls. This increases the "arc gap" distance along these junctures and thus provides a barrier to arc penetration.

Before the envelope 12 is hermetically sealed, it is evacuated, charged with a suitable fill gas (such as argon or a mixture of argon and neon at a pressure of several Torr) and then dosed with mercury through a tubulation (not shown) in the usual manner to provide an ionizable medium that sustains an electric discharge when the lamp 10 is energized. As shown in FIG. 3, the panel segments 15 (except the one which is adjacent to and extends between the electrodes 16 and 17) are provided with apertures 30 at alternate ends so that the envelope sectors are interconnected and define a continuous discharge channel that traverses the envelope 12 in retroverted fashion from one of the electrodes to the other.

Since the ends of the partition assembly 14 are firmly seated against the compliant pads 26 and 27 which, in turn, are seated against the support disc 24 and envelope end wall 13, the core chamber C is closed off from the electric discharge and thus displaces, or "pushes", the arc away from the central portion of the lamp 10 toward the arcuate walls of the envelope 12. The surfaces of the support disc 24 and partition assembly 14 that are exposed to the discharge are coated with a suitable phosphor that is excited by the ultraviolet radiation generated by the discharge and emits visible radiations. Insofar as the surfaces of the panel segments 15 that define the closed core chamber C are not exposed to the discharge, they can be left uncoated.

As will be noted in FIG. 2, the panel segments 15 in accordance with this particular embodiment are of such configuration that they form six sectors or arc channels that are of equal size, generally trapezoidal in cross-section and disposed around a core chamber C of hexagonal cross-section. The fluorescent lamp 10 is thus of single-ended construction and constitutes a "six pass" lamp in which the arc discharge traverses the envelope 12 six times in retroverted fashion as it passes from one electrode to the other. The relative size of the core chamber C and the envelope 12 according to this particular embodiment is such that the maximum cross-sectional dimension of the chamber is approximately 50% of the envelope's inner diameter.

As shown in FIG. 2, the inner surface of the envelope 12 is also coated with a layer 32 of suitable phosphor that is responsive to ultraviolet radiation. When the partition assembly 14 is fabricated from sheet metal, as in the illustrated embodiment, it is preferably first coated with an inert light-reflecting material to enhance the light output of the lamp 10. This dual-coating is illustrated in FIG. 2A. The partition assembly 14 is thus provided with a base coat 34 of suitable light-reflecting material (such as $TiO_2$, $MgO$, $BaSO_4$, $Al_2O_3$, $ZnO$ and mixtures thereof) that is over-coated with the phosphor layer 33.

As indicated by the arrows in FIG. 3, the arc discharge passes along the respective panel segments 15 through the apertures 30 from one side of the non-apertured panel segment and terminates on the opposite side of such segment. Thus, the partition assembly 14, in conjunction with the flat end wall 13 and arcuate side walls of the tubular envelope 12, defines a single continuous discharge channel that is approximately six times the length of the envelope and thus provides a compact light source 10 of intense brightness.

The novel features of the present invention are readily apparent by comparing FIG. 2 with FIG. 4 which illustrates the cross-sectional configuration of the arc channels provided by a single-ended "six pass" fluorescent lamp 10a of conventional design that is identical in all respects with the lamp 10 except that it contains a partition assembly 14a that has panel segments 15a which intersect at the envelope axis and radially extend to the envelope walls. Since the panel segments 15a of the conventional lamp 10a meet at the envelope axis, the cross-sectional shape of each of the discharge channels is generally triangular and involves very sharp acute angles. Insofar as the only useful light is that which passes out of the lamp through the bulb walls, sone of the light rays that are generated at (or are reflected back into) the corners located deep within the lamp along the envelope axis may, because of the geometry involved, be reflected a number of times in the corners and be finally absorbed there and lost. In addition, the portion of the generated ultraviolet energy from the arc which reaches the phosphor on the envelope wall (compared to the total area of the phosphor-coated surfaces) is low, for example, about ⅓ in the case of a "six-pass" fluorescent lamp having a partition assembly that has metal-to-metal corners of 60°.

In contrast, the improved "hollow core" lamp 10 of the present invention has corner angles (as shown in FIG. 2) that are less acute, less prone to trap light, and located closer to the arcuate wall of the envelope 12. Since the total area or surface that is phosphor coated is reduced, by virtue of the fact that the "deep" inner corners are replaced by the flat rear segments of the panel segments 15 that define the core chamber C, the portion of the generated-UV that reaches the phosphor coating 32 on the bulb wall is proportionately increased.

The resulting increase in light output at a given wattage is substantial and is graphically illustrated in FIG. 5. As will be noted from curve 35, the "six pass" fluorescent lamp with the conventional triangular-shaped discharge channels had a light output of about 1480 lumens at 40 watts and its output progressively increased to approximately 2300 lumens at 70 watts. In contrast, a "six pass" lamp of the same size but having a partition assembly that provided trapezoidal-shaped discharge channels and an hexagonal-shaped 50% core chamber had a light output of approximately 1800 lumens at 40 watts and, as indicated by curve 36, its output progressively increased in a manner such that it produced over 2700 lumens at 70 watts. The fluorescent lamps used in obtaining the data shown in FIG. 5 were both of the single-ended variety and had cylindrical envelopes approximately 10 centimeters in diameter, partition assemblies that were approximately 15 centimeters long and were constructed in the manner illustrated in FIGS. 2 and 4.

It will accordingly be apparent to those skilled in the art that the improved lamp having a partition assembly which provides a closed core chamber C of carefully controlled size that forces the discharge to follow a path which is offset from the envelope axis toward the envelope walls produces a marked improvement in lamp performance by eliminating light-entrapment losses and by utilizing the generated ultraviolet energy in a more efficient manner.

The present invention is not limited to the trapezoidal-shaped discharge channels and hexagonal-shaped core chamber employed in the lamp 10 illustrated in FIGS. 1 and 2. For example (as shown in FIG. 6A), a core chamber $C_1$ of circular shape can be provided in a "six pass" lamp 10b by fabricating the partition assembly 14b from six planar segments 15b that are attached to a tube 38 of circular cross-section and extend radially to the wall of the tubular envelope 12b. Of course, the UV-irradiated surfaces of the partition assembly and envelope of each of the alternative lamps would be coated with phosphor although such material has not been shown in the drawing.

Alternatively, sharp "interior" corners can be entirely eliminated from the discharge channels by making the panel segments 40 of the partition assembly 14c from sheet metal or the like that is arcuate or bowed in cross-section, thus providing a series of concave channel elements that are joined to a centrally-located hollow tube 42 which defines a circular-shaped core chamber $C_2$. The "tabbed" longitudinal edges of the respective arcuate segments 40 are seated against the inner curved wall of the tubular envelope 12c and thus provide a "six pass" fluorescent lamp 10c that has a series of concave-shaped envelope sectors for the discharge.

A core chamber of larger size can readily be provided by constructing a single-ended "four-pass" lamp 10d having a partition assembly 14d with panel segments that consist of inner planar portions 44 which define a square-shaped core chamber $C_3$ and are terminated by outer portions 46 that readially extend from the corners of the chamber to the walls of the tubular envelope 12d.

DOUBLE-ENDED FLUORESCENT LAMP EMBODIMENT (FIG. 7)

Figure 7:
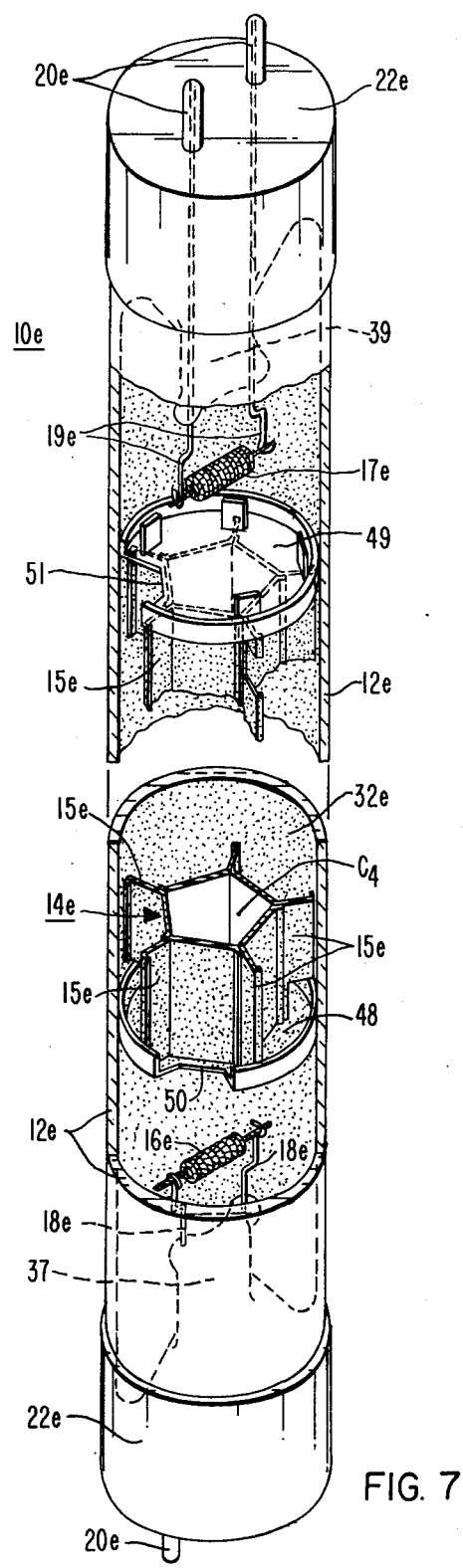
FIG. 7 is a perspective view of a double-ended fluorescent lamp which embodies the invention, portions of the envelope and partition assembly being cut away for illustrative purposes.

The present invention is also not limited to fluorescent lamps of the single-ended type but includes within its scope lamps that are of double-ended construction. Such a lamp 10e is shown in FIG. 7 and employs a standard tubular glass envelope 12e of circular cross-section that has an inner coating 32e of phosphor and is terminated at each end by conventional two-lead type glass stem assemblies 37 and 39. The lead-in wires 18e and 19e extend through the respective stems and support the electrodes 16e and 17e at opposite ends of the envelope 12e. The outer ends of the lead wires are connected to suitable terminals such as metal pins 20e that are anchored in base members 22e attached to the sealed ends of the envelope 12e. As in the case of the single-ended fluorescent lamp 10 previously described, the envelope 12e is evacuated and then charged with a suitable ionizable medium (such as a fill gas and a dose of mercury) before it is hermetically sealed.

The interior of the envelope 12e is divided into five interconnected sectors by a partition assembly 14e which is inserted into the envelope 12e. The assembly is dimensioned so that it makes a snug fit with the envelope walls and is thus frictionally locked in place between the electrodes 16e and 17e with the ends of the partition assembly spaced and isolated from the respective electrodes. As shown, the partition assembly 14e consists of five panel segments 15e that are joined together and provide five arc channels or sectors that extend along the envelope 12e and surround a central core chamber $C_4$ that extends along the envelope axis and is of pentagonal cross-section. The ends of the partition assembly 14e are fastened to transverse members such as caps 48 and 49 that are seated against the ends of the partition panels 15e and thus close the core chamber $C_4$ and each of the envelope sectors. The end caps 48, 49 have flanged edges and include compliant seating pads (not shown) which prevent the arc from bypassing the partition assembly, or any of its panel segments.

As will be noted, end cap 48 has an angular segment removed to provide an opening 50 that provides a connecting passageway from electrode 16e into the associated envelope sector. The other end cap 49 has a similar opening 51. Alternately-disposed ends of the panel segments 15e are provided with openings (not shown) which permit the arc discharge to pass through the envelope sectors in retroverted and sequential fashion from one of the electrodes to the other. Of course, the panel segment 15e that is adjacent the end cap openings 50, 51 is of solid construction throughout to isolate the electrodes from one another. The lamp 10e is thus a "five pass" type. As in the previous embodiment, the inner surface of the envelope 12e is coated with phosphor 32e and the surfaces of the partition assembly 14e that are exposed to the discharge are also coated with phosphor.

CORE SIZE CRITERIA

An important and critical feature of the present invention resides in the discovery that for optimum lamp performance the partition assembly within the envelope not only had to be modified to provide a closed-off core chamber C but that the size of such chamber relative to the envelope size had to be controlled and maintained within certain limits. It was found that if the relative size of the core chamber is made too large, the electrical characteristics of the discharge became such that the current density and starting voltage became excessive. On the other hand, if the relative size of the core chamber is made too small, the loss in light output resulting from the "light entrapment effect" and the inefficient use of the UV energy increased to a level such that the overall improvement in lamp performance was too small to justify the added expense of using a "hollow core" type partition.

The aforesaid critical relationship was discovered by fabricating four test lamps of double-ended "five-pass" construction that were of the same size (partition assemblies approximately 115 millimeters long in tubular envelopes around 53 millimeters in diameter) and were identical in every respect except that they contained partition assemblies that had core chambers which ranged in size from 0% to 76%. As indicated in FIGS. 8A to 8D, one of the test lamps 10f contained a partition assembly 14f having panel segments 15f that radially extended from the axis of the tubular envelope 12f to the envelope walls and thus divided the interior of the envelope into five equal triangular-shaped sectors. This lamp accordingly had no core chamber since the panel segments intersected each other along the bulb axis (0% core).

The test lamp 10g (shown in FIG. 8B) was fitted with a partition assembly 14g having panel segments 15g that divided the bulb interior into five sectors and provided a central core C of pentagonal shape that had a maximum cross-sectional dimension which was equivalent to 24% of the envelope diameter (24% core).

Figure 8A:
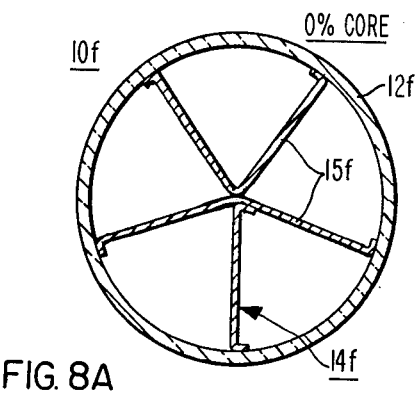
FIGS. 8A to 8D are cross-sectional views of a series of double-ended type fluorescent lamps having partition assemblies that provide sectored envelopes which have core chambers that range in size from 0% to 76% of the bulb diameter.
Figure 8B:
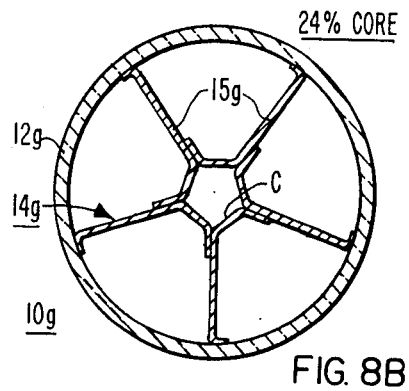
Figure 8C:
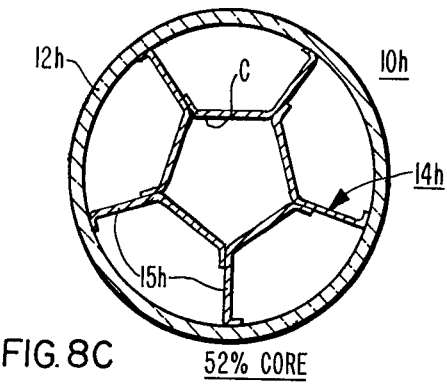

The test lamp 10h shown in FIG. 8C had a partition assembly 14h whose panel segments 15h were of shorter dimension and provided a pentagonal-shaped core chamber C with a maximum cross-sectional dimension that was equivalent to 52% of the envelope diameter (52% core).

Figure 8D:
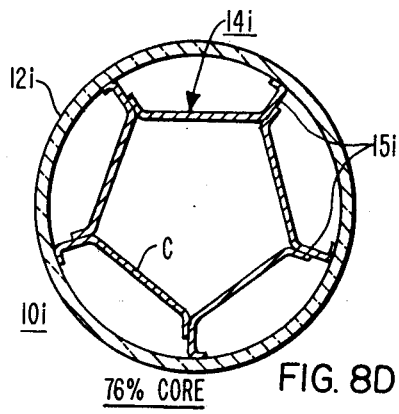

The last test lamp 10i is shown in FIG. 8D and contained a partition assembly 14i which had panel segments 15i that provided five very shallow envelope sectors and a large core chamber C of pentagonal shape that had a maximum cross-sectional dimension that was equivalent to 76% of the bulb diameter (76% core).

Each of the test lamps was operated over a range of currents and power inputs in order to determine the effect which power loading and various core sizes had on the lumen and lumen per watt characteristics of the lamps under such operating conditions.

Figure 9:
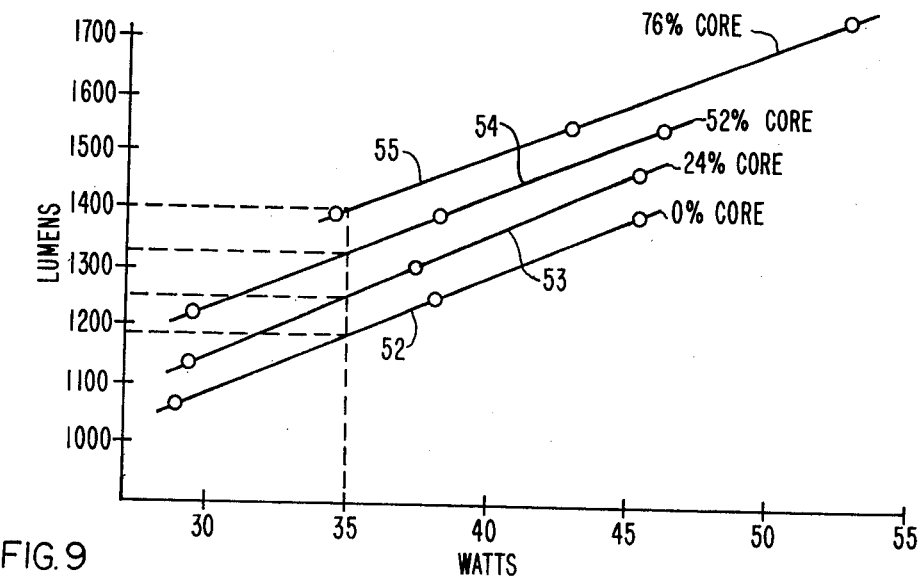
FIGS. 9, 10, and 11 are graphs comparing the light output and lumen per watt characteristics of the various fluorescent lamps shown in FIGS. 8A to 8D.

The effect on lumen output at a given power input or wattage loading is shown in FIG. 9. As indicated by curves 52, 53, 54 and 55, the lumen output for each of the test lamps increased as the power input was increased and the rate of increase was approximately the same for each of the lamps (as indicated by the fact that the curves are substantially parallel to one another). However, as the size of the core chamber was increased from 0% to 24%, 52% and 76% of the envelope diameter, a corresponding increase was produced in the lumen output at each power input. As indicated in FIG. 9, at a power input of 35 watts for example, the test lamp having a 0% core had a light output slightly less than 1200 lumens, an output of approximately 1260 lumens with a 24% core, an output of approximately 1340 lumens with a 52% core, and about 1400 lumens with a 76% core. The lumen output accordingly materially increased as the relative size of the core chamber increased and provided arc channels that became progressively more shallow and thus "pushed" the discharge closer to the bulb walls.

Figure 10:
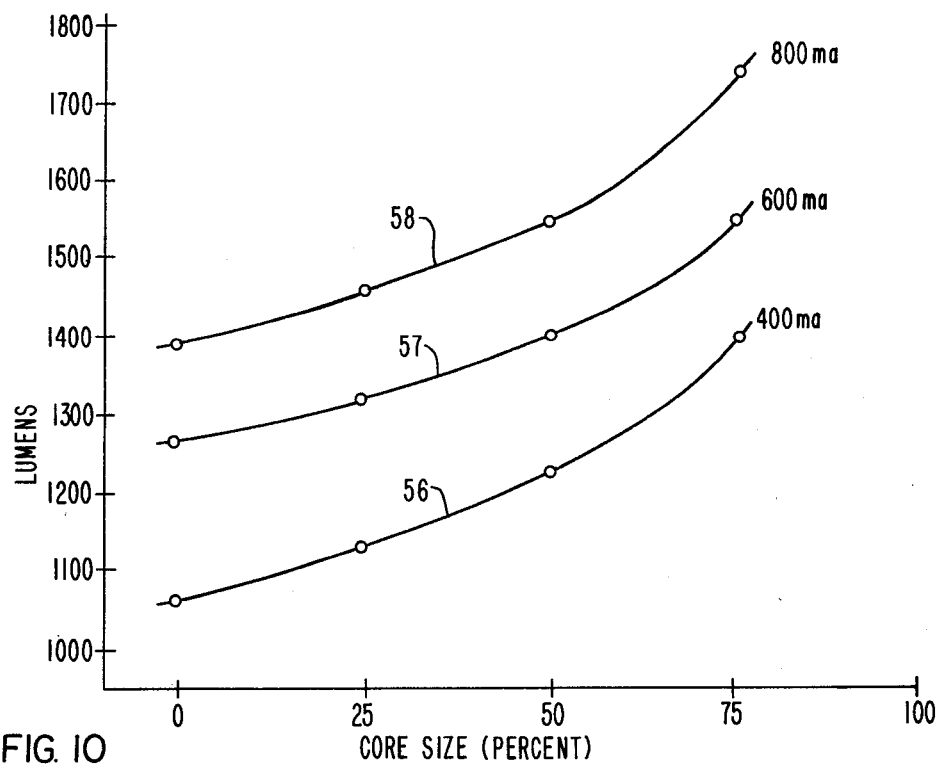

The effect on the lumen output produced by the various core sizes when the test lamps were operated at a given current loading is shown in FIG. 10. As indicated by curves 56, 57 and 58, the lumen output again increased as the current loading was increased from 400 milliamperes (ma), to 600 ma and finally to 800 ma. Once again, the light output was lowest with the test lamp having 0% core size, and progressively increased in the lamps having core sizes that were 24%, 52% and 76% of the envelope diameter. As indicated by the rather sharp upward "swing" of each of the curves, the rate of lumen increase became more pronounced as the core size was increased from 52% to 76%.

Figure 11:
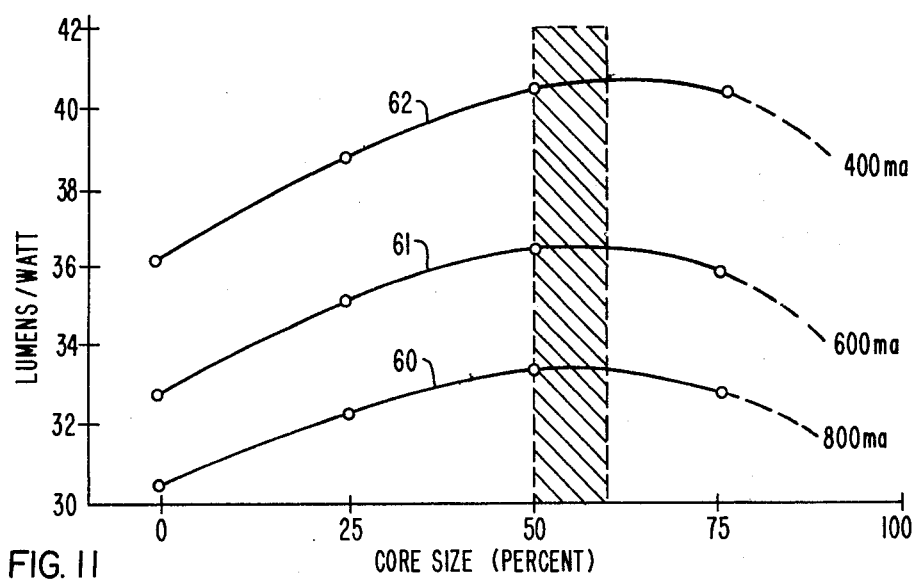

However, the test lamps revealed that for optimum efficacy at any given current or power loading, the core size should be maintained within the range of from about 25% to 85% of the envelope diameter. This is graphically shown by curves 60, 61 and 62 depicted in FIG. 11 which show the change in the lumen per watt characteristics of the various test lamps as the current loading and core size were varied. As indicated by curve 60, the efficacy at a current loading of 800 ma reached a maximum when the core size was approximately 50%. At 600 ma, the overall efficacy was greatly improved and peaked when the core size was approximately 55%. At 400 ma, the overall efficacy improved to an even greater degree and was at a maximum when the core size was around 60%. Thus, while a marked improvement in efficacy at each of the current loadings used in the comparative lamp test was obtained with partition assemblies having core sizes that ranged from about 25% to 85% of the envelope diameter, the greatest improvement in efficacy was obtained with core sizes in the range from about 50% to 60%, as indicated by the "hatched bar" portion of the graph shown in FIG. 11.

We claim as our invention:

1. A low-pressure electric discharge lamp comprising;
    an elongated light-transmitting sealed envelope that contains an ionizable medium and a pair of spaced electrodes,
    conductor means extending into said envelope and connected to the respective electrodes, and
    an elongated partition assembly within said envelope having a plurality of panel segments that define a continuous discharge channel which extends between the electrodes and substantially traverses the envelope a predetermined number of times in retroverted fashion,
    the panel segments of said partition assembly extending longitudinally along and inwardly from the walls of said envelope and being so shaped and arranged that they divide the envelope interior into a plurality of interconnected sectors and also form an elongated centrally-located chamber that is closed to the discharge and constitutes the core of said partition assembly,
    the size of the core chamber defined by said partition assembly being correlated with that of the envelope and being such that the maximum cross-sectional dimension of said core chamber at a given location is from about 25% to about 85% of the maximum cross-sectional dimension of the envelope at the same location so that the discharge is displaced outwardly toward the envelope walls as it traverses the respective envelope sectors formed by the panel segments of the partition assembly.

2. The electric discharge lamp of claim 1 wherein said envelope and core chamber are of substantially uniform cross-sectional configuration and dimension throughout the length of the partition assembly.

3. The electric discharge lamp of claim 1 wherein the surfaces of the partition assembly and envelope that are exposed to the discharge are coated with phosphor and said lamp thus comprises a fluorescent lamp.

4. The fluorescent lamp of claim 3 wherein;
said electrodes and conductor means are located at the same end of the envelope and the lamp thus comprises a single-ended type fluorescent lamp, and
one of the panel segments of the partition assembly extends between and isolates the electrodes from one another and the remaining panel segments have openings therein at alternately-disposed ends which permit the discharge to traverse the envelope sectors in sequential fashion.

5. The fluorescent lamp of claim 3 wherein;
said electrodes are located at opposite ends of the envelope and the lamp thus comprises a double-ended type fluorescent lamp,
said partition assembly is terminated at each end by a transverse member which closes the core chamber to the discharge and defines a passageway for the discharge to the associated electrode, and selected panel segments each have an opening therein which permits the discharge to traverse the envelope sectors in sequential fashion.

6. The fluorescent lamp of claim 3 wherein said envelope is of tubular configuration and the partition assembly is composed of sheet metal and comprises a component that is in slip-fitted relationship with the tubular envelope and is so dimensioned that the longitudinal edge portions of the respective panel segments are seated against the envelope wall.

7. The fluorescent lamp of claim 3 wherein;
said envelope is of tubular configuration and substantially circular in cross-section throughout the length of the partition assembly, and
the core chamber defined by said partition assembly substantially extends along the envelope axis.

8. The fluorescent lamp of claim 7 wherein the panel segments of said partition assembly are of substantially planar configuration and define a core chamber of polygonal cross-sectional configuration.

9. The fluorescent lamp of claim 7 wherein the panel segments of said partition assembly are of substantially planar configuration and are secured to and radially extend from a tubular support member that defines a core chamber of arcuate cross-sectional configuration.

10. The fluorescent lamp of claim 7 wherein the panel segments of said partition assembly are of arcuate cross-sectional configuration.

* * * * *